United States Patent [19]

Weiler et al.

[11] Patent Number: 4,671,762

[45] Date of Patent: Jun. 9, 1987

[54] APPARATUS FOR FILLING A MOLDED CONTAINER WITH LIQUID CONTENTS

[75] Inventors: Gerhard H. Weiler, South Barrington; Louis T. Pagels, Hanover Park, both of Ill.

[73] Assignee: Automatic Liquid Packaging, Inc., Arlington Heights, Ill.

[21] Appl. No.: 719,166

[22] Filed: Apr. 2, 1985

Related U.S. Application Data

[63] Continuation-in-part of Ser. No. 364,477, Apr. 1, 1982, abandoned.

[51] Int. Cl.[4] .............................................. B29C 49/42
[52] U.S. Cl. .................................... 425/524; 251/331; 264/524; 264/525
[58] Field of Search ............... 425/524, 522, 525, 163; 264/40.4, 524, 525; 137/403, 408; 53/140; 215/1 C; 141/311 R; 251/331

[56] References Cited

U.S. PATENT DOCUMENTS

| Re. 27,155 | 7/1971 | Hansen | 425/524 |
|---|---|---|---|
| 3,251,915 | 5/1966 | Pechthold | 264/524 |
| 3,464,085 | 9/1969 | Burkett et al. | 264/525 X |
| 3,523,401 | 8/1970 | Hansen | 53/140 X |
| 3,597,793 | 8/1971 | Weiler et al. | 425/525 X |
| 3,650,678 | 3/1972 | Hansen | 53/140 X |
| 3,664,793 | 5/1972 | Hansen | 425/163 X |
| 3,674,405 | 7/1972 | Hansen | 425/525 |
| 3,809,768 | 5/1974 | Berry | 264/525 X |
| 3,919,374 | 11/1975 | Komendowski | 264/274 X |
| 3,930,258 | 12/1975 | Dick et al. | 137/408 X |
| 4,132,242 | 1/1979 | Carroll, Jr. | 137/403 X |
| 4,176,153 | 11/1979 | Weiler et al. | 425/522 X |
| 4,178,976 | 12/1979 | Weiler et al. | 222/107 X |

*Primary Examiner*—Richard L. Chiesa
*Attorney, Agent, or Firm*—Dressler, Goldsmith, Shore, Sutker & Milnamow, Ltd.

[57] ABSTRACT

An apparatus is disclosed for filling a molded container and includes an inner filling tube provided with a valve member disposed for sliding engagement within the filling tube. A system is provided for supplying the filling tube with liquid product under pressure and includes a liquid product pressure vessel, a pump for supplying the pressure vessel with liquid product, pressurization means for pressurizing the pressure vessel with a gas such as air, nitrogen, or the like, associated interconnecting conduits, means for controlling the flow of the liquid product under pressure to the filling tube, and means for maintaining a desired amount of liquid product in the pressure vessel. A steam sterilization system and a system integrity testing means are also provided with the liquid product supply system.

11 Claims, 6 Drawing Figures

FIG. 6

APPARATUS FOR FILLING A MOLDED CONTAINER WITH LIQUID CONTENTS

CROSS-REFERENCE TO RELATED APPLICATION

This application is a continuation-in-part of our copending application U.S. Ser. No. 364,477, filed on 1 Apr. 1982, now abandoned.

TECHNICAL FIELD

This invention relates, in general, to an improved system for filling a molded container with liquid product in those automatic operations wherein an extruded length of parison is first molded to form a container, then filled, and subsequently sealed.

BACKGROUND OF THE INVENTION

Various patents disclose methods and apparatus for forming, molding, and filling a container. See, for example, U.S. Pat. Nos. 3,251,915, 3,464,085, 3,523,401, 3,597,793, 3,664,793, 3,674,405, 3,919,374, 4,176,153, 4,178,976, Re. 27,155 and patents cited therein.

Some of the methods and apparatus disclosed in the above-identified patents employ an extendable and retractable blowing and filling assembly having means operative on a length of extruded parison in a main mold for blow molding the container body portion through a top opening in the parison and for then filling the molded container with a liquid product through the top opening. Such a blowing and filling assembly typically includes an outer mandrel tube having a lower end portion defining an exterior mandrel surface adapted for engaging a portion of the interior surface of the length of parison to seal the parison opening with the exterior mandrel surface pressing the parison against the main mold. Typically, the blowing and filling assembly outer mandrel tube also defines an interior chamber in which is disposed an inner tube.

Various internal arrangements are disclosed in some of the above-identified patents for such assemblies whereby pressurized gas is discharged for blow molding the container, whereby the pressurized gas is vented from the container after it is blow molded, and whereby the liquid product is subsequently discharged into the container. The above-listed U.S. Pat. No. 3,597,793 discloses such an assembly wherein the liquid product is discharged through an inner tube into the container when a flat valve plate at the end of the inner tube is opened. U.S. Pat. No. 3,523,401, along with U.S. Pat. Nos. 4,176,153 and 4,178,976, all listed above, disclose apparatus wherein the inner tube from which liquid is discharged also contains a third tube through which the blow molding gas is discharged. In these apparatus, the blow molding gas is subsequently vented from the container through an annular flow passageway defined between the inner filling tube and the outer mandrel tube.

Also, U.S. Pat. No. 3,251,915 shows a fixed filling assembly that is integral with the extruder head and that utilizes a fixed amount of gas trapped in the head space of a liquid product supply vessel to dispense the liquid product to a container to be filled. However, such an arrangement does not maintain a substantially constant pressure head above the product to be dispensed inasmuch as the pressure head necessarily decreases as the head space in the supply vessel increases during dispensing of the product.

Apparatus operating generally in accordance with the teachings of the above-listed U.S. Pat. Nos. 3,523,401 and Re. 27,155 is sold commercially by Automatic Liquid Packaging, Inc., 2445 East Oakton Street, Arlington Heights, Ill. 60005, U.S.A.

Although the commercial apparatus discussed above works very well with many applications, it would be desirable to provide method and apparatus whereby the filling time of the molded container could be reduced.

Further, it would be desirable to provide a filling apparatus in which the valve mechanism controlling the discharge of the liquid product has a highly effective and a drip-free shut-off capability. It has been found that, in some instances, a small drop of liquid product may cling to the filling apparatus after it is withdrawn from the molded and filled container. Subsequently, when the filling apparatus is next extended into a new length of parison, the discharge of pressurized gas into the parison (during the molding step) will carry with it the drop of liquid product. The drop of liquid product may or may not be broken into a number of smaller drops by the pressurized gas stream. In any case, the single drop, or the resulting smaller drops, may impinge upon the walls of the container being formed from the hot, soft parison with the pressurized air. This can cause undesirable cratering or pitting of the soft interior surface of the blow molded container. Thus, it would be desirable to provide a valve mechanism in which tight, drip free, shut-off can be ensured.

In addition, it would be advantageous to provide a method and apparatus for supplying the liquid product to the filling apparatus at a desired pressure. Devices have been proposed for filling a container, such as one blow molded from thermoplastic material, wherein the liquid product is discharged to a filling nozzle by means of piston and cylinder actuators. See, for example, U.S. Pat. No. 3,670,787. However, there are advantages with a system that does not require the use of one or more hydraulic piston and cylinder actuators for supplying the desired volume of liquid product at the desired pressure to the blow molding and filling assembly.

Further, it would be beneficial to provide a means in such a system for determining the amount of liquid product available for supplying to the molding and filling assembly, and to provide means for automatically replenishing the supply as the liquid product is discharged from the molding and filling assembly.

In addition, with such a system, it would be desirable to provide the capability for steam sterilization of the system prior to the introduction therein of a sterile liquid product. Such a system should facilitate the use of a sterile liquid in accordance with procedures that comply with conventional requirements applicable to the handling of sterile liquids.

SUMMARY OF THE INVENTION

A method and apparatus is provided for use with equipment for molding and pressure filling a container from an extruded length of parison in the form of a vertically oriented, elongated, hollow tube. The equipment typically has a main mold means for forming at least a body portion of the container, a gripping means for maintaining an opening at the top of the length of parison in the portion of the parison extending upwardly above the main mold means, and an extendable and retractable blowing and filling assembly with means operative on the length of parison in the main mold means for molding the container through the top opening and for then filling the molded container with a pressurized liquid product through the top opening.

The molding and filling assembly includes an outer mandrel tube and an inner filling tube which terminates within the outer mandrel tube. The outer mandrel tube has a lower end portion defining an exterior mandrel surface adapted for engaging a portion of the interior surface of the length of parison to seal the parison opening with the exterior mandrel surface pressing the parison against the main mold means. The outer mandrel tube also defines an interior chamber surrounding the inner filling tube.

According to the present invention, the outer mandrel tube and the inner filling tube are positioned to define at least one passageway between the outer mandrel tube and the inner filling tube for (1) passing a molding gas such as air, nitrogen, or the like under pressure into the parison to mold the container and (2) subsequently venting at least a portion of the gas under pressure from the molded container.

The inner filling tube has an interior surface defining at least one filling duct. A metering valve having a fill valve stem may be disposed within the filling duct and may be provided with a valving member at one end of the inner filling tube in the filling duct. The valving member is in sliding engagement with the interior surface of the inner filling tube, has longitudinally extending flow passages, and is adapted to be moved by the fill valve stem between a retracted position completely occluding the inner tube filling duct and at least a partially extended position wherein part of the valve member projects beyond the distal end of the inner filling tube for permitting the passage of the product through the filling duct, out of the inner filling tube, and into the molded container. Alternatively, a metering valve member may be provided upstream from the filling tube.

In one preferred embodiment the liquid product is supplied under pressure to a pressure vessel that is continuously pressurized with a compressed gas, i.e., compressed air, compressed nitrogen, or the like, to maintain a substantially constant pressure head in the pressure vessel. Liquid product from the pressure vessel is conveyed to the inner filling tube of the blowing and filling assembly under a substantially constant pressure head. To fill, a metering valve member is opened for a predetermined time period to permit passage of the desired quantity of the liquid product into the molded container. The amount of liquid product present at any time in the pressure vessel is monitored by means of a weight measuring device such as a scale.

In another preferred embodiment, the pressure vessel is omitted or by-passed, and the metering valve member is pressurized directly by a pump that conveys the liquid product to be filled. In this particular embodiment the liquid product stream usually is continuously recirculated by the product pump and a predetermined portion of the recirculating stream is dispensed for filling by the metering valve member.

The apparatus of this invention resides in the novel combination, construction, arrangement, and disposition of various component parts and elements incorporated in the apparatus in accordance with the principles of this invention. The method of this invention resides in the combination of unique process steps for, inter alia, rapidly filling a container with a liquid product. The method of the present invention offers a number of advantages and eliminates a number of disadvantages heretofore associated with the filling of a molded container with a liquid product.

Features of the present invention other than those specifically enumerated above will become apparent when consideration is given to the following detailed description which, when taken in conjunction with the annexed drawings, describes, discloses, illustrates, and shows a preferred embodiment of the present invention and what is presently considered and believed to be the best mode of practicing the principles of the invention.

BRIEF DESCRIPTION OF THE DRAWINGS

In the accompanying drawings forming part of the specification and in which like numerals are employed to designate like parts throughout the same.

DESCRIPTION OF THE PREFERRED EMBODIMENT

This invention may be used in many different forms. The specification and the accompanying drawings disclose only one specific form as an example of the use of the invention. The invention is not intended to be limited to the embodiment illustrated, and the scope of the invention will be delineated in the appended claims.

The precise shapes and sizes of the components herein described are not essential to the invention unless otherwise indicated.

For ease of description, the apparatus of this invention will be described in a normal (upright) operating position and terms such as upper, lower, horizontal, etc., will be used with reference to this position. It will be understood, however, that the apparatus of this invention may be manufactured, stored, transported, used and sold in an orientation other than the position described.

The apparatus of this invention has certain conventional drive mechanisms and control mechanisms the details of which, though not fully illustrated or described, will be apparent to those having skill in the art and an understanding of the necessary functions of such mechanisms.

Figures 1, 2, 3, 4:
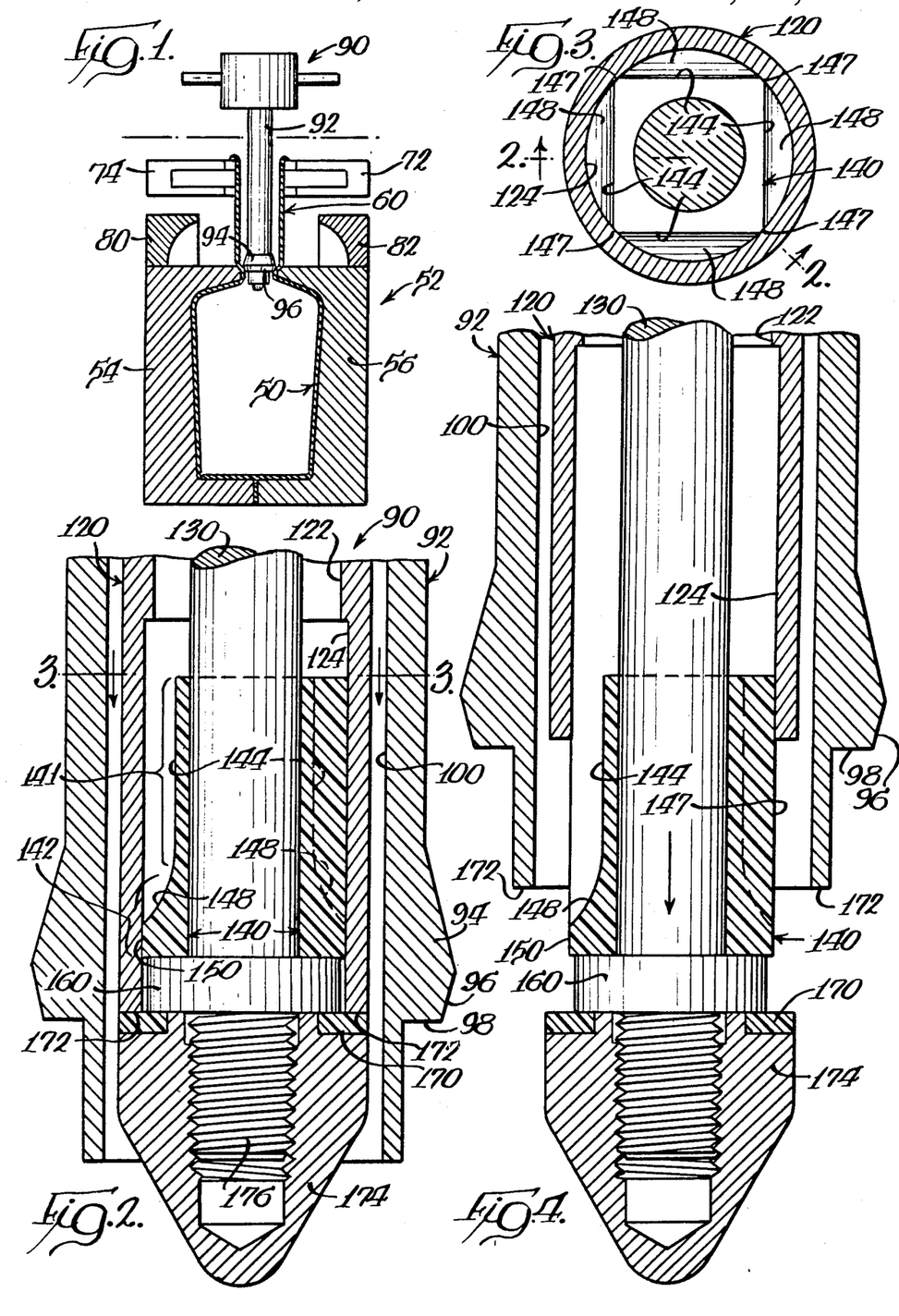
FIG. 1 is a diagrammatic view of a blowing and filling assembly cooperating with a mold assembly to form a container from a length of parison.
FIG. 2 is an enlarged fragmentary cross-sectional view of the lower end of the blowing and filling assembly which is inserted into the mold assembly for molding and filling the container.
FIG. 3 is a cross-sectional view taken generally long the plane 3—3 in FIG. 2.
FIG. 4 is an enlarged fragmentary cross-sectional view similar to FIG. 2 but showing the valve member moved to an extended position so as to permit passage of liquid product into the molded container.

The teachings of the present invention find application in the filling of molded thermoplastic containers having a wide variety of shapes and sizes. FIG. 1 illustrates the overall process of molding a container. The container such as container 50, is molded generally in accordance with the techniques disclosed in the above-referenced U.S. Pat. No. Re. 27,155 and as practiced using the above-discussed machine sold by Automatic Liquid Packaging, Inc., 2445 East Oakton Street, Arlington Heights, Ill. 60005, U.S.A.

In FIG. 1, various conventional parts or elements of a blow molding machine are represented schematically and will be recognized by one skilled in the art. Detailed descriptions of the structure of such elements are not necessary to an understanding of the invention, and accordingly, are not herein presented.

The apparatus illustrated in FIG. 1 includes a number of conventional mechanisms that may be regarded as analogous or identical to the mechanisms found in the aforementioned machine sold by Automatic Liquid Packaging, Inc. discussed above. A number of the major mechanisms of the machine are generally similar to the apparatus disclosed in the above-referenced U.S. Pat. No. Re. 27,155 and the method of operation of the machine is generally similar to the method described in that patent. The description of the method and apparatus disclosed in the U.S. Pat. No. Re. 27,155 is incorporated herein by reference to the extent pertinent and to the extent not inconsistent herewith.

As shown in FIG. 1, the molding apparatus includes a mold assembly 52 which is shown in a closed position around a length of parison 60 that has already been molded to form the container body 50. The mold assembly or main mold means 52 comprises a first mold half 54 and a second mold half 56. Above the mold halves 54 and 56 are situated a pair of holding gripper jaws 72 and 74 and a pair of sealing mold halves 80 and 82. The gripper jaws 72 and 74 function as gripping means for holding a parison segment and maintaining an opening at the top of the length of parison 60 that extends upwardly above the mold halves 54 and 56. Typically, the gripper jaws include vacuum passages (not visible in FIG. 1) extending to the surface of the jaws through which vacuum can be drawn for holding the parison length 60 in position.

Mounted for movement with, and also relative to, the main mold half 54 is the sealing mold half 80. Similarly, mounted on main mold half 56 for movement with, and also relative to, the main mold half 56 is the sealing mold half 82. The sealing mold halves 80 and 82 are adapted to close about the parison 60, after the container 50 has been molded and filled, so as to form a closure sealing the top of container 50 when filled.

An extendable and retractable blowing and filling assembly 90 is provided to expand the length of parison 60 with pressurized gas within the closed mold halves 54 and 56 and to subsequently fill the container 50 with the desired liquid product. The filling assembly 90 is adapted to be inserted in the hollow tube of parison 60. Before this can occur, however, the parison 60 is first extruded from a forming die of an extruder in conventional manner. Then the mold halves 54 and 56 are closed about the parison 60 and the gripper jaws 72 and 74 engage the parison 60 to maintain the opening in the parison 60 above the mold halves 54 and 56 so as to facilitate the insertion of the assembly 90.

As best illustrated in FIGS. 1 and 2, the blowing and filling assembly 90 includes an outer mandrel tube 92 having an enlarged lower end portion 94 defining an exterior mandrel surface 96. The surface 96 tapers slightly outwardly from a lower shoulder 98 (as best seen in FIG. 2).

When the blowing and filling assembly 90 is lowered inside the parison 60, the tapered surface 96 presses the parison 60 against the main mold halves 54 and 56. This seals the interior of the parison 60 against blowing and filling assembly mandrel tube 92 and permits the parison 60 to be expanded with pressurized gas as will be explained in detail hereinafter. If desired, parison expansion can also be assisted effected by vacuum drawn through the main mold halves 54 and 56.

The structure of the outer mandrel tube 92 and its interaction with the parison 60 and mold assembly parts as described above are generally the same as in the apparatus disclosed in the above-identified U.S. Pat. No. Re. 27,155 and as incorporated in the above-mentioned machines sold by Automatic Liquid Packaging, Inc. However, in the present invention, the interior components within the outer mandrel tube 92 are different and operate in a different manner. These interior components will next be described in detail with reference to FIGS. 3 and 4.

The mandrel tube 92 has a generally cylindrical interior surface 100 defining a chamber having a generally circular-cross section. Disposed within the outer mandrel tube 92 is an inner filling tube 120. Inner filling tube 120 terminates within mandrel tube 92, has a generally cylindrical exterior surface, and cooperates with the outer mandrel tube 92 to define a generally annular passageway between the outer mandrel tube 92 and the inner filling tube 120. This passageway functions for (1) passing a blow molding gas under pressure into the parison to mold the container and (2) subsequently venting at least a portion of the gas from the molded container. Molding gas, such as compressed air, is admitted into the passageway between the outer mandrel tube 92 and the inner filling tube 120 by conventional valve means (not illustrated).

The gas is vented from the container 50 after the container has been molded in order to facilitate the filling of the container with liquid product. To this end, the annular passageway defined between the outer mandrel 92 and the inner filling tube 120 communicates with ambient atmosphere through a suitable vent valve mechanism (not illustrated) which is operated through a suitable control system (not illustrated) to vent the container 50 after it is formed. The mechanisms and controls for such venting of the blow molding gas are well known. Further, suitable mechanisms and controls for providing proper venting of an annular passageway between an outer mandrel and an inner tube are described in the above-referenced U.S. Pat. No. 3,523,401. The specific mechanisms and controls by which such venting is accommodated form no part of the present invention.

The fill tube 120 is hollow and has an interior surface comprising a first cylindrical interior surface 122 and a second interior cylindrical surface 124. The interior surface 124 defines a generally cylindrical chamber at the distal end of the inner fill tube 120 which has a diameter slightly greater than the diameter of the cylindrical volume defined by the first interior surface 122. The volume defined within the fill tube 120 by the surfaces 122 and 124 constitutes a filling duct extending along the inside of the tube 120 through which liquid product is discharged into the molded container. The filling duct of inner tube 120 ends before the distal end of mandrel tube 92, and the latter serves as an exit port for the liquid product dispensed into the container to be filled.

Within the filling duct of inner tube 120 is a fill valve stem 130. A valve or valve member 140 is disposed on the fill valve stem 130 at one end of the inner fill tube 120 and is in sliding engagement with the interior surface 124 of the inner filling tube.

As illustrated in FIGS. 2 and 3, the valve stem 130 is a generally cylindrical rod. The valve member 140 mounted thereon includes a first portion 141 having four planar surfaces 144 which each extend across the interior chamber of the inner fill tube 120 and terminate adjacent the interior surface 124. The valve member 140 has a second portion 142, downstream of the first portion 141, that defines four curved surfaces 148. Each curved surface 148 merges with one of said planar surfaces 144 and curves outwardly to the interior surface 124 of the chamber of the inner fill tube 120 when the valve member 140 is in a retracted position as illustrated in FIGS. 2 and 3. The second portion 142 of the valve member 140 also includes a generally cylindrical guide surface 150 below, and contiguous with, the outwardly curving surfaces 148.

Preferably, though not essential to the operation of the present invention, the planar surfaces 144 of the valve member 140 each extend across the fill tube 120 interior chamber to the interior surface 124. Between any two adjacent planar surfaces 144, a longitudinally extending guide surface 147 (FIG. 3) serves to align and guide the valve member 140 for reciprocation within the chamber of the fill tube 120. These longitudinally extending guide surfaces 147 extend to and merge with the cylindrical guide surface 150 at the end of the valve member 140.

The valve member 140 defines, in cooperation with the interior surface 124 of the inner fill tube 120, four longitudinally extending flow passages. Each flow passage lies between two guide surfaces 147 and communicates at the upstream end with the inner filling tube filling duct or chamber. Each flow passage terminates at the downstream end within the valve member 140 at the outwardly curving surface 148. In the embodiment illustrated, four such longitudinally extending product flow passages are defined in an equally spaced circumferential array within the valve member 140.

When the valve member 140 is in the retracted position illustrated in FIGS. 2 and 3, the valve member 140 completely occludes the filling duct defined by the interior surface 124 of the inner chamber in the fill tube 120.

The valve stem 130 is actuatable by suitable conventional means (not illustrated) to reciprocate between the retracted position illustrated in FIG. 2 and at least a partially extended position illustrated in FIG. 4 wherein part of the valve member 140 projects beyond the distal end of the inner fill tube 120 for permitting passage of liquid product out of the tube and into the molded container. The means for reciprocating the valve stem 130 may include a conventional piston and cylinder hydraulic actuator mechanism analogous to those disclosed in the above-referenced U.S. Pat. No. 3,523,401 for reciprocating the various tubes and valve stems of the blowing and filling device described therein. The details of the particular mechanism for effecting such reciprocating movement of the valve stem 130 form no part of the present invention.

The valve member 140 may be made from any suitable material. In the preferred embodiment illustrated, the valve member 140 is preferably fabricated from a synthetic resin polymer such as that sold in the U.S.A. under the trade name and trademark "Teflon."

As best illustrated in FIG. 2, an annular flange 160 may be provided on the valve stem 130 downstream of the valve member 140. To insure a leak-tight seal within the mechanism, an annular sealing gasket or seal 170 may be provided below the annular flange 160 as best illustrated in FIG. 2. The seal 170 may be fabricated from a silicone rubber material such as that sold in the U.S.A. under the designation "Viton" or from other suitable seal material.

The seal 170 preferably extends radially outwardly of the annular flange 160 and is adapted to engage an end face 172 of the filling tube 120. The annular seal 170 is retained in the blowing and filling assembly by means of a retainer 174 which is threadingly engaged on a threaded extension 176 of the valve stem 130. The retainer 174 may be regarded as forming a distal end portion of the valve stem extending outwardly beyond the valve member 140.

In the illustrated preferred embodiment of FIGS. 2-4, the valve member 140 defines in cooperation with the interior surface 124 of the inner filling tube 120, four longitudinally extending product flow passages (more precisely, each flow passage is defined between one flat surface 144, one curved surface 148, and the inner fill tube interior surface 124). It is to be realized, however, that one such flow passage may provide satisfactory operation, depending upon the size of the passage, the pressure of the liquid product to be discharged through the valve, etc.

Further, although the guide surfaces 147 are shown as being equally spaced around the valve member 140, it is to be understood that any suitable guide surface may be incorporated. Instead of four separate guide surfaces 147, a single guide surface may be incorporated. Further, the guide surfaces 147 may be eliminated altogether in an appropriate design wherein the valve stem 130 is suitably and sufficiently guided relative to the inner filling tube 120 by the particular valve stem reciprocating mechanism (not illustrated).

In a typical molding and filling apparatus operating in accordance with the principles of the present invention, a plurality of containers, such as container 50 illustrated in FIG. 1, can be formed and filled simultaneously using a multi-cavity mold. Accordingly, the blowing and filling assembly 90 can include a plurality of mandrels 92 (each with the associated inner filling tube and valve member) for operating simultaneously on a plurality of lengths of extruded parison tubes held within the mold to form and fill the containers. However, with a multi-cavity mold, separate fill cycles for each cavity can also be performed, if desired, by appropriate programming of the valve opening and closing.

It is to be understood that the liquid product may be supplied to the inner fill tube 120 by any suitable mechanism, apparatus, or supply system. A suitable supply system, and one having a number of unique advantages, is described hereinafter with reference to FIG. 5. However it is to be understood that the novel valve structure described above with reference to FIGS. 1-4 may be used with other suitable liquid product supply systems as well.

Figure 5:
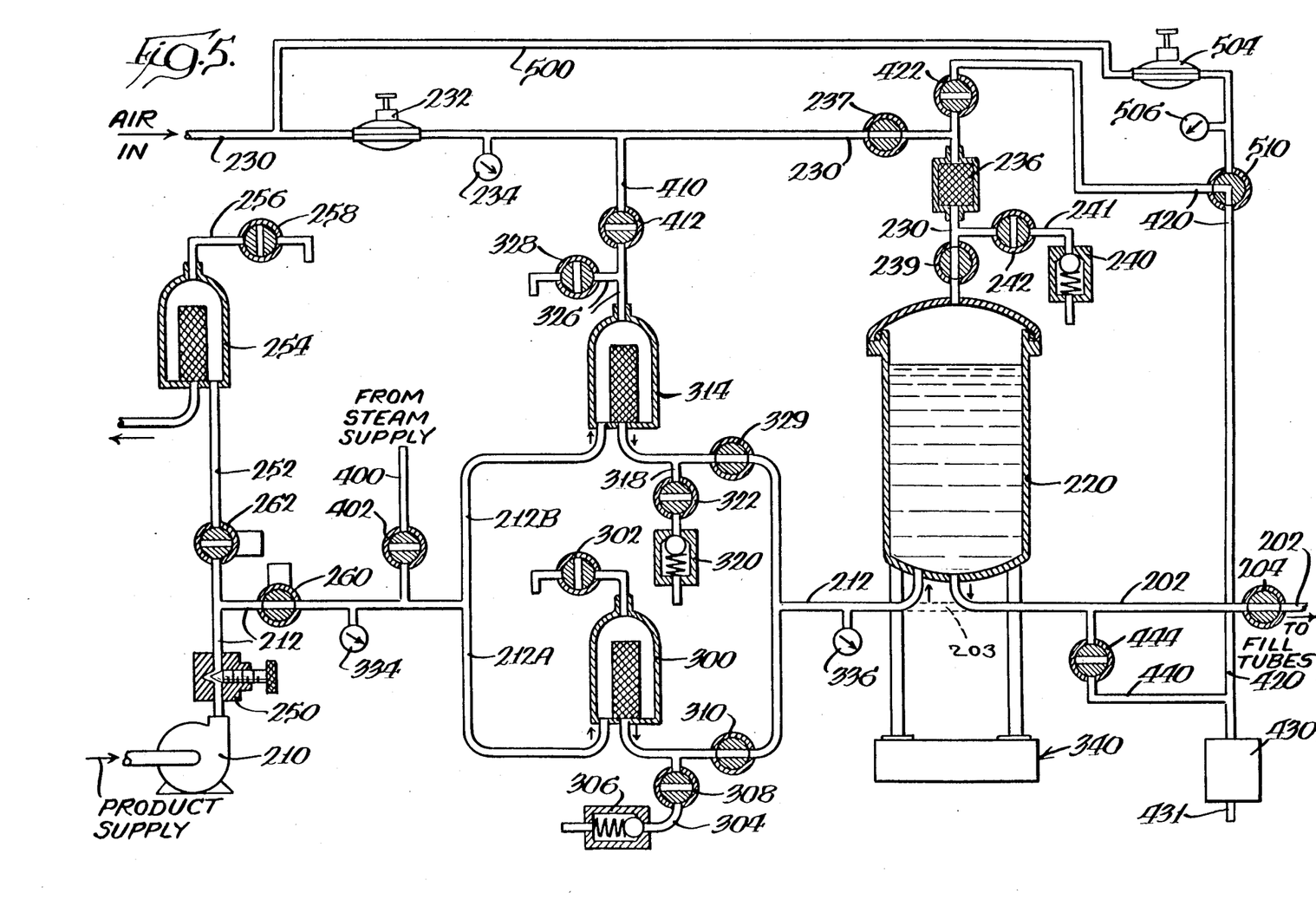
FIG. 5 is a schematic diagram of the system for providing liquid product under pressure to one or more filling tubes of a blowing and filling assembly.

The system and apparatus for supplying liquid product to one or more fill tubes in a blowing and filling assembly is diagrammatically illustrated in FIG. 5. With reference to the lower right-hand side of FIG. 5, the liquid product is supplied to containers to be filled through a discharge conduit 202 which may include a normally open shut-off valve 204 that can be closed for maintenance or testing purposes as desired. Normally, the valve 204 is open to permit liquid product to pass through the discharge conduit 202 to the fill tubes, such as fill tube 120 discussed above with reference to FIGS. 2-4.

The liquid product is supplied to the system from a suitable supply or reservoir (not illustrated) by a pump 210 (as illustrated in the lower left-hand corner of FIG. 5). The pump 210 supplies the pressurized liquid product through a supply conduit 212 to a pressure vessel 220 that contains a predetermined amount of the liquid product. The liquid product discharges from the pressure vessel 220 through the conduit 202 when a valve in the blowing and filling assembly is opened. Such a valve may be the valve member 140 in the filling tube 120 illustrated in FIG. 1. The amount of liquid product discharged is controlled in such a case by the time period during which the valve member 140 is open inasmuch as during the relatively short product discharge period the pressure head in the vessel 220, constituting the liquid product driving force, remains substantially constant.

The pressure vessel 220 is pressurized with the suitable gas through a gas conduit 230. The gas conduit 230 is supplied with a pressurized gas, such as compressed air, from a suitable gas pressurization means, such as a compressor (not illustrated). The gas conduit 230 preferably includes a valve or gas pressure regulator 232 and a pressure indicating gauge 234. Also, the gas conduit 230 may include a filter 236.

Immediately downstream of the filter 236 is a drain conduit 241 that includes a check valve 240. Normally, the drain conduit 241 is valved out with a suitable shut-off valve 242. The valve 242 is temporarily opened during start-up to drain condensed vapor.

The filter 236 can be isolated for maintenance by closing normally open valves 237 and 239 which are provided on either side of the filter 236.

The flow of liquid product from the pump 210 is preferably regulated with a suitable flow control valve 250 in the liquid product supply conduit 212 at the discharge of the pump 210. If desired, a bypass flow conduit or recirculation conduit 252 may be connected to the liquid product supply conduit 212 at the discharge of the pump 210 for permitting a return flow of liquid product to the liquid product source or reservoir. Preferably, a filter 254 is provided in the return conduit 252. The filter 254 preferably includes a vent conduit 256 with an isolation valve 258 for venting that portion of the system during start-up.

In a preferred method of operating the liquid supply system, the pump 210 is operated continuously. Liquid product is, however, only intermittently provided to the pressure vessel 220 by the pump 210. To this end, a first valve 260 is provided in the liquid product supply conduit 212 on the discharge of the pump 210 and a second valve 262 is provided in the return conduit 252. When it is desired to provide more liquid product to the pressure vessel 220, the valve 260 is opened (as illustrated in FIG. 5) and valve 262 is closed. After the pressure vessel 220 has been filled with the desired amount of liquid product, the valve 260 is closed and the valve 262 is opened to recirculate the liquid product back to the liquid product supply reservoir.

Preferably, valves 260 and 262 are electric solenoid valves and are actuated as appropriate by a suitable control system responsive to the amount of liquid product in the pressure vessel 220. The means for monitoring the amount of liquid product in the pressure vessel 220 is explained in detail hereinafter.

Preferably, the liquid product supply conduit 212 is provided with two parallel branches 212A and 212B. Branch conduit 212A is provided with a filter 300 having a vent valve 302 and a discharge drain conduit 304. The discharge drain conduit 304 includes a check valve 306 which is normally valved out by means of a valve 308.

Also, conduit 212A is preferably provided with a shut-off valve 310 downstream of the filter 300. Valve 310 is normally open during operation of the system to supply liquid product to the filling tubes.

Parallel branch conduit 212B also contains a filter 314. In branch conduit 212B there is provided a drain conduit 318 downstream of the filter 314. The drain conduit 318 is provided with a check valve 320 that is normally valved out of service with a suitable valve 322.

A vent conduit 326 is provided on filter 314 to vent the system at that point during initial filling of the system. The vent is normally closed with a suitable valve 328.

Conduit 212B is preferably provided with a shut-off valve 329 downstream of the filter 314. Valve 329 is normally open during operation of the system to supply liquid product to the filling tubes.

Preferably the filters 300 and 314 between the pump 210 and pressure vessel 220 are monitored during operation to insure that they are properly operating. To this end, the product supply conduit 212 is provided with a first pressure indicator or gauge 334 upstream of the filters 300 and 314 and is provided with a second pressure indicator or gauge 336 downstream of the filters 300 and 314. An increase in the pressure differential between the two pressure gauges is an indication of increased amount of particulate matter present in the filters.

Preferably the pressure vessel 220 is mounted on a conventional scale or other means for weighing the pressure vessel 220 and its liquid product contents. In FIG. 5, such a scale is diagrammatically illustrated by the rectangle designated with the reference numeral 340. The scale 340 includes suitable conventional sensing and control means for determining the weight of the pressure vessel and liquid product contents and also for comparing the measured weight to a predetermined set weight. The predetermined set weight corresponds to the weight of the pressure vessel 220 plus the weight of a predetermined amount of liquid product contents and, if desired, can be a weight range having a permissible maximum set weight and a permissible minimum set weight.

In operation, when the scale 340 senses a weight equivalent to the predetermined set weight, an output signal is sent to a suitable control system which in turn actuates the electric solenoid valve 260 to close that valve and to simultaneously open the electric solenoid valve 262 so that the liquid product provided by pump 210 is recirculated back to the product source (such as a reservoir, not illustrated).

The pressure vessel 220 and the liquid product contents therein are continuously pressurized with a suitable compressed gas via the gas conduit means 230. Preferably the liquid product in the pressure vessel 220 is maintained under a pressure of between 30 and 40 lbs./sq. in. gauge.

The liquid product is pressurized in the pressure vessel 220 and in the discharge conduit 202 up to the filling tubes of the blow molding and filling apparatus where the liquid product is prevented from discharging unless and until a suitable valve is opened at the appropriate point in the molding and filling operation. One such suitable valve is valve member 140 (and associated structure) described above with reference to FIGS. 1-4. It is to be realized, however, that the product supply system described above with reference to FIG. 5 and the method of operating the system in accordance with the teachings of the present invention, may be effective with any suitable valve mechanism in a blowing and filling assembly.

After the desired amount of liquid product has been discharged through the filling tubes to the molded containers, the valve mechanism or mechanisms associated with the blowing and filling assembly are closed to prevent the further discharge of the liquid product. The product discharged from the pressure vessel 220 necessarily reduces the weight load as measured by the scale 340. When the measured weight load is less than the predetermined set weight value, the control system operates to open electric solenoid valve 260 at the discharge of pump 210 and to close the recirculating conduit valve 262. Thus, liquid product is again admitted to the pressure vessel 220. The liquid product continues to be supplied to the pressure vessel 220 until the scale 340 measures a weight load corresponding to the predetermined set weight value. At this point, the control system again closes the electric solenoid valve 260 and opens the recirculation conduit valve 262.

Alternately, pressure vessel 220 can be omitted or by-passed. In such an event product supply conduit 212 and product supply conduit 202 communicate with one another directly as shown in phantom in FIG. 5 at 203. System pressure is communicated directly to metering valve member or members, as the case may be, downstream from supply conduit 202. Preferably, product pump 210 is operated continuously as described hereinbefore and a portion of the liquid product stream is recirculated via return conduit 252 as hereinabove described.

Figure 6:
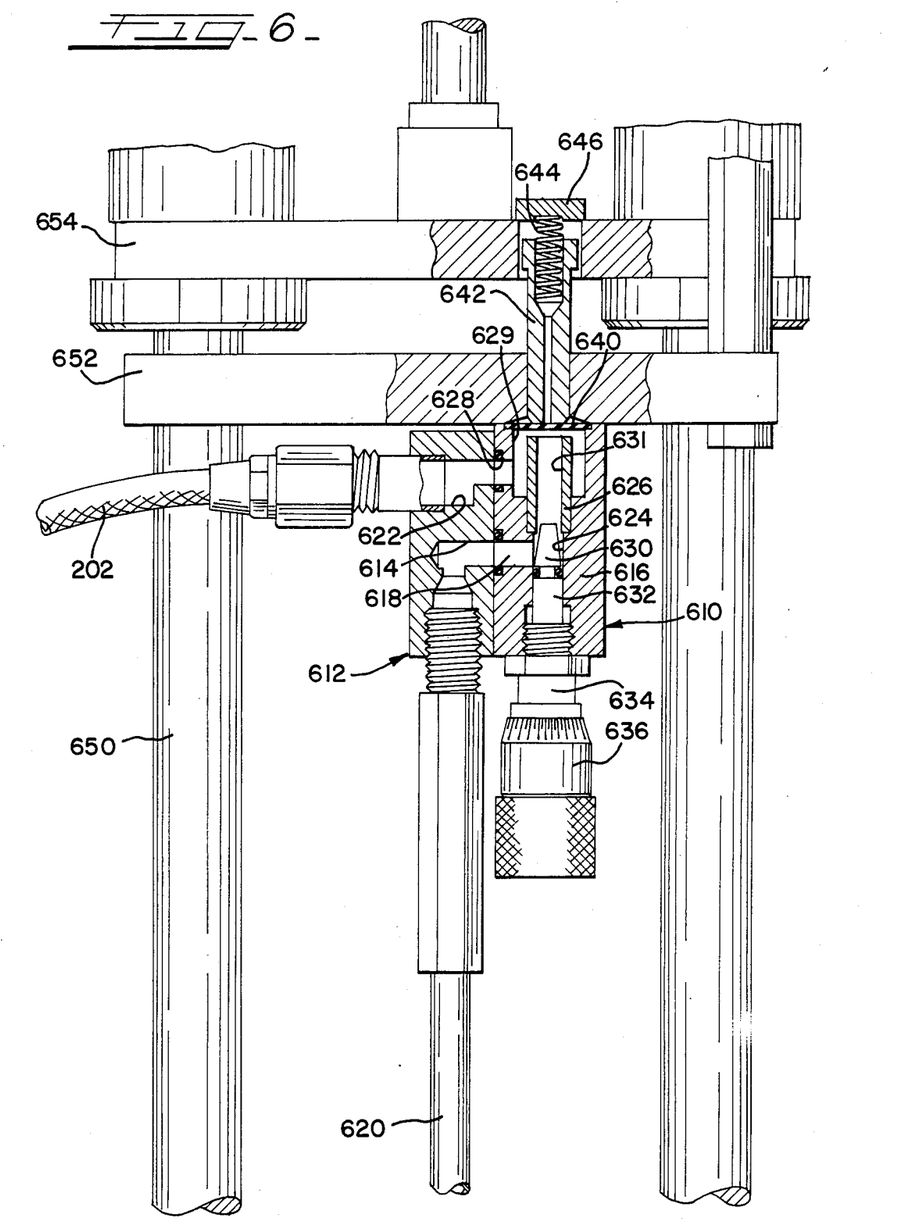
FIG. 6 is a side elevational view, partly in section, showing a metering valve upstream from the filling tube.

An alternate metering valve assembly 610 that can be placed between the hollow fill tube such as fill tube 620 and pressure vessel 220 (FIG. 5) in lieu of valve member 140 (FIGS. 2-4) is shown in FIG. 6. Metering valve assembly 610 is contiguous with product manifold 612. Both the metering valve assembly 610 and the product manifold 612 are suitably mounted on frame 650 provided with cross-member 652.

Product manifold 612 defines product passageway 622 that communicates with product supply conduit 202 and manifold cavity 614. One or more hollow fill tubes, such as fill tube 620 depend from product manifold 612 and communicate with cavity 614.

Metering valve assembly 610 includes valve body 616 that defines product passageways 618 and 628, and product chamber 629 therebetween. Hollow tubular valve manifold 626 is provided for each fill tube, is mounted in valve body 616, and extends into product chamber 629. Valve manifold 626 defines internal conduit 631 which provides a confined flow passageway communicating with product chamber 629 at the free end thereof and with product passageways 618 and 624 at the end thereof mounted in valve body 616, i.e., at the mounted end.

Flexible diaphragm 640 extends across the free end of valve manifold 626 but is spaced therefrom when diaphragm 640 is in a relaxed state. Diaphragm 640 also seals one end of product chamber 629 and is positioned to occlude conduit 631 when urged thereagainst by plunger 642 mounted substantially coaxially with valve manifold 626 but on the opposite side of diaphragm 640 from valve manifold 626.

Needle valve plug 630 is adjustably received within the mounted end of valve manifold 626 and is carried on valve stem 632 in needle valve body 634 mounted in metering valve body 616. Positioning of needle valve plug 630 is effected by vernier handle 636.

Valve plunger 642 is slidably received in cross-member 652 above diaphragm 640 and is mounted for reciprocating movement in carriage 654 by means of spring 644 and spring retainer 646.

In a container filling operation, initially plunger 642 is in its downwardly position, extending diaphragm 640 from its rest position and pressing diaphragm 640 against the free end of valve manifold 626 so as to occlude conduit 631. When a container has been formed as described hereinabove and is ready to be filled, plunger 642 is moved upwardly, diaphragm 640 is relaxed, and conduit 631 is opened for a predetermined time period while gas pressure in product vessel 220 drives liquid product through passageways 202, 622, 631, 624 and 618 first into manifold cavity 614 and then into the fill tubes such as fill tube 620. The rate at which liquid product enters manifold cavity 614 is determined by system pressure and the position of needle valve plug 630 within conduit 631 at the mounted end thereof. After the desired amount of liquid product has been dispensed from vessel 220, plunger 642 is again moved against diaphragm 640 to occlude conduit 631.

When the liquid product handled by the system is a sterile product, such as sterile pharmaceutical compositions, the system conduits and components should also be rendered sterile and maintained sterile. To this end, the supply system is provided with a steam sterilization capability. In particular, sterilizing steam is admitted to the system, prior to molding and filling the containers with the desired product, through a first steam conduit 400 from a suitable source of sterilizing steam (such as a steam boiler, not illustrated).

The first steam conduit 400 is connected to the liquid product supply conduit 212 upstream of the filters 300 and 314 and downstream of the electric solenoid valve 260. A shut-off valve 402 is provided in conduit 400 and is normally closed. The valve 402 is opened only during the steam sterilization of the system prior to the molding and filling of the containers. From the first steam supply conduit 400, the sterilizing steam may be directed to all conduits and components in the liquid product supply portion of the system.

Further, a second steam supply conduit 410 is provided to connect the liquid product conduit 314 with the gas conduit 230 to enable the sterilizing steam to be directed to the gas pressurization portion of the system. Normally the second steam supply conduit 410 is valved closed by means of a valve 412. However, during the steam sterilization of the system, the valve 412 is opened to admit sterilizing steam to the gas supply conduits and associated apparatus.

Condensate return conduits are provided for draining the sterilized steam condensate from the system. Specifically, a condensate return line 420 is provided to connect the gas conduit 230 (from a point immediately upstream of the air filter 236 in the upper right-hand corner of FIG. 5) with a suitable conventional steam trap 430 (in the lower right-hand corner of FIG. 5). The steam trap 430 discharges condensate to a discharge line 431. The condensate drain line 420 is normally closed with a suitable valve 422 which is opened only during the steam sterilization process.

Another condensate drain line 440 is provided to drain the liquid product discharge conduit 202 to the drain conduit 420 and into the steam trap 430. The conduit drain line 440 is normally closed with a suitable valve 444 which, except during the steam sterilization process, is normally closed.

A novel system is also provided for testing the integrity of the system. To this end, a test pressure supply conduit 500 is connected to the gas conduit 230 upstream of the gas pressure regulator 232. The conduit 500 is provided with its own separate pressure regulator 504 and with a pressure-indicating gauge 506. The conduit 500 is downstream of the pressure regulator 504 and is connected through a three-way valve 510 to the condensate drain conduit 420. When the system is to be pressure tested, the three-way valve 510 is positioned to admit the pressurized gas from regulator 504 into the upstream portion of the condensate drain conduit 420. The shutoff valve 422 in the condensate drain conduit 420 is opened to permit the test gas to pressurize the various conduits and apparatus associated with the liquid product supply system, including a portion of the pressurization gas conduit 230. During the integrity test, liquid product is typically not present in the pressure vessel 220, the shut-off valve 204 in the liquid product discharge conduit 202 is closed, and the electric solenoid valve 260 at the discharge of the pump 210 is closed. Integrity of the filters within the system, e.g., product filters 300 and 314, can be ascertained by noting the gas pressure drop across the filters as the pressurizing gas is passed therethrough.

With the above described liquid product supply system, it is seen that liquid product can be supplied to a blowing and filling assembly under a pressure that is sufficient to rapidly fill blow molded containers with liquid product. Further, the liquid product supply system provides means for automatically maintaining liquid product under pressure to the blowing and filling assembly and provides means for rapidly repressurizing the system with additional liquid product after the containers have been filled with liquid product. Also, it is seen that the novel product supply system includes means for sterilizing the system when filling the blow molded containers with a sterilized product. Additionally, the novel product supply system incorporates a unique integrity test system.

The foregoing description is intended as illustrative but not limiting. Numerous variations and modifications may be effected without departing from the spirit and scope of the invention.

What is claimed is:

1. In an apparatus for molding a container from an extruded length of parison in the form of a vertically oriented, elongated, hollow tube, and for filling the container with liquid product, said apparatus having (1) a main mold means for forming at least a portion of the container body, (2) gripping means for maintaining an opening at the top of the length of parison in a portion of the parison extending upwardly above the main mold means, and (3) an extendable and retractable blowing and filling assembly having means operative on the length of parison in the main mold means for molding the container with a temporary top opening and having at least one filling tube for filling the molded container with said liquid product discharged from the tube through the temporary opening, the improvement wherein the apparatus includes a supply system to supply liquid product to said tube under pressure, said supply system characterized in that the supply system includes:
(a) a pump supplying said liquid product under pressure;
(b) a continuously pressurized pressure vessel for receiving said liquid product from said pump;
(c) liquid product supply conduit means for connecting said pump with said pressure vessel;
(d) gas pressurization means for continuously supplying compressed gas to and maintaining a substantially constant pressure head in said pressure vessel;
(e) gas conduit means for connecting said gas pressurization means with said pressure vessel;
(f) liquid product discharge conduit means for connecting said pressure vessel with said blowing and filling assembly filling tube; and
(g) metering valve means operable between (1) a closed position occluding flow of said liquid product through said filling tube and (2) an open position permitting passage of said liquid product through said filling tube into the molded container while the pressure head in said pressure vessel remains substanially constant, said metering valve means including a valve manifold defining a liquid flow passageway, a reciprocating-plunger actuated diaphragm for sealing said liquid flow passageway, and an adjustable needle valve plug positioned in said liquid flow passageway downstream from said diaphragm, said diaphragm together with said needle valve plug providing drip-free shut-off of said liquid product when said metering valve means is in said closed position.

2. The apparatus in accordance with claim 1 including a liquid product filter disposed in said liquid product supply conduit means.

3. The apparatus in accordance with claim 1 further including means for supplying sterilizing steam to said system, further including first steam conduit means for connecting said steam supply means with said liquid product supply conduit between said pump and said pressure vessel, and further including second steam conduit means for connecting said liquid product supply conduit with said gas conduit.

4. The apparatus in accordance with claim 1 further including a weight measuring means for determining said pressure vessel contents, and further including control means responsive to said weight measuring means for controlling the flow of said liquid product into said pressure vessel.

5. The apparatus in accordance with claim 1 in which a reservoir is provided for supplying said liquid product to said pump and further including a liquid product return conduit means for connecting the discharge of said pump with said reservoir.

6. The apparatus in accordance with claim 1 including a filter disposed in said gas conduit means.

7. The apparatus in accordance with claim 1 wherein the metering valve means is situated upstream from said filling tube and comprises a plunger-actuated diaphragm that occludes flow of liquid product when the diaphragm is extended.

8. In an apparatus for molding a container from extruded length of parison in the form of a vertically oriented, elongated, hollow tube, and for filling the container with the liquid product, said apparatus having (1) a main mold means for forming at least a portion of the container body, (2) gripping means for maintaining an opening at the top of the length of parison in a portion of the parison extending upwardly above the main mold means, and (3) an extendable and retractable blowing and filling assembly having means operative on the length of parison in the main mold means for molding the container with a temporary top opening and having at least one filling tube for filling the molded container with said liquid product discharged from the tube through the temporary top opening, the improvement wherein the apparatus includes a supply system to supply liquid product to said tube under pressure, said supply system characterized in that the supply system includes:
   (a) a pump for supplying said liquid product continuously and under pressure;
   (b) liquid product discharge conduit means for connecting said pump directly with said blowing and filling assembly filling tube; and
   (c) metering valve means operable between (1) a closed position occluding flow of said pressurized liquid product through said filling tube and (2) an open position permitting passage of said liquid product through said filling tube into the molded container while the pressure head in said liquid product discharge conduit means remains substanially constant, said metering valve means including a valve manifold defining a liquid flow passageway, a reciprocating-plunger actuated diaphragm for sealing said liquid flow passageway, and an adjustable needle valve plug positioned in said liquid flow passageway downstream from said diaphragm, said diaphragm together with said needle valve plug providing drip-free shut-off of said liquid product when said metering valve means is in said closed position.

9. The apparatus in accordance with claim 8 including a liquid product filter disposed in said liquid product supply conduit means.

10. The apparatus in accordance with claim 8 further including means for supplying sterilizing stem to said system, further including means for connecting said steam supply means with said liquid product supply conduit.

11. The apparatus in accordance with claim 8 wherein the metering valve means is situated upstream from said filling tube and comprises a plunger-actuated diaphragm that occludes flow of liquid product when the diaphragm is extended.

* * * * *

UNITED STATES PATENT AND TRADEMARK OFFICE
CERTIFICATE OF CORRECTION

PATENT NO. : 4,671,762

DATED : June 9, 1987

INVENTOR(S) : Gerhard H. Weiler and Louis T. Pagels

It is certified that error appears in the above-identified patent and that said Letters Patent is hereby corrected as shown below:

Col. 14, line 5, after "temporary" insert -- top --.

Col. 14, line 10, after "pump" insert -- for --.

Col. 16, line 19, "stem" should be -- steam --.

Col. 16, line 20, after "including" insert -- steam conduit --.

Signed and Sealed this

Seventh Day of June, 1988

Attest:

DONALD J. QUIGG

*Attesting Officer*   *Commissioner of Patents and Trademarks*